Jan. 18, 1949.    F. C. RISSELT    2,459,241
AIR RELIEF VALVE FOR HEATING SYSTEMS
Filed Oct. 27, 1944
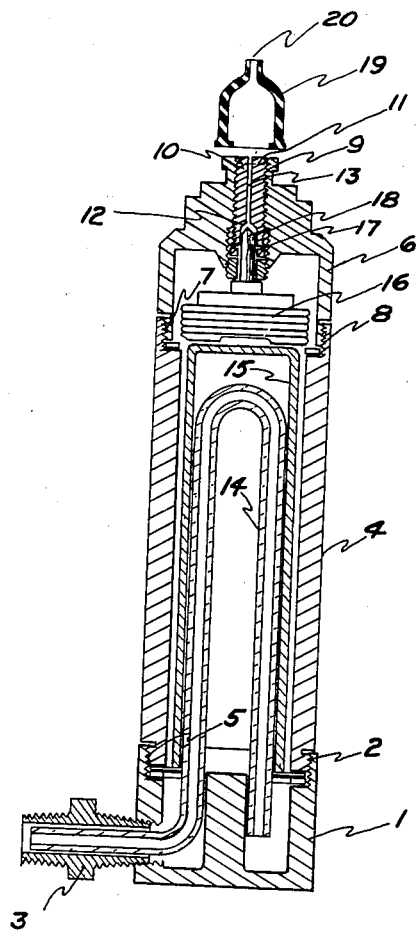
INVENTOR.
FRANK C. RISSELT
BY Patented Jan. 18, 1949

2,459,241

UNITED STATES PATENT OFFICE 2,459,241

AIR RELIEF VALVE FOR HEATING SYSTEMS

Frank C. Risselt, Cincinnati, Ohio, assignor to Josephine M. Risselt, Cincinnati, Ohio Application October 27, 1944, Serial No. 560,571

3 Claims. (Cl. 236—62)

My invention relates to improvements in air relief valves of the thermostatic bellows type such for example, as is shown in Patent No. 1,825,459 of which I was joint inventor, and to improvements therein.

It is the object of my invention to provide an air relief valve for a steam heated system which is readily adjustable, but which when once adjusted, will be entirely automatic in operation.

It is also an object of my invention to provide an air relief valve for the radiators of steam heating systems which will automatically avoid the formation of water pockets which cause hammering and require a bleeding of the valve to eliminate condensed water.

It is an object to provide a valve having a syphon tube which automatically drains the valve back into the steam supply pipe or radiator discharge pipe prior to such time as an accumulation of condensed water causes filling up of the valve. It is also my object to provide such a valve which will be automatic on either two pipe radiators (having an inlet and outlet), or single pipe radiators (having only an inlet—the condensed water draining back through the inlet pipe).

It is my object to provide a valve having an automatic float which eliminates the necessity of a water bleed outlet (often causing much damage to floors and stock piled thereon).

It is a further object to provide such a valve with a vacuum cap preventing intake of air during intervals of vacuum within the heating system.

Broadly my invention may be described as automatic, vacuumatic and thermostatic, since when once adjusted it is automatic, a one-way slitted rubber cap preventing intake of air making it vacuumatic and the thermostatic valve making it responsive to temperature conditions therefore making it thermostatic.

The foregoing objects and other objects to which reference will be made in the ensuing disclosure, I accomplish by that certain combination and arrangement of parts of which I have shown a preferred embodiment.

Referring to the drawing, I have shown in the figure a sectional view of the assembly.

The combination consists in the base 1 having an internally threaded opening 2, and an externally threaded extension or coupling 3 for attachment into a threaded opening in the radiator or supply or outlet pipe. The intake for the valve is thus at its base.

A cylindrical shell 4 threaded as at 5, engages the internal threads 2 of the base. A cap 6 having threads 7 engage the threads 8 of the shell 4.

The cap 6 has an internally threaded bore 9 which is engaged by the threads of an adjustable screw 10 having a notch 11 at its exposed end permitting movement of the screw 10 within the threaded bore 9 of the cap, and making fine degrees of adjustment and the venting of a predetermined amount of air possible without taking the valve apart. The elements so far described compose the valve chamber.

The valve seat 12 is formed in the screw at the lower end of a passage 13 through which the air within the radiator escapes to the atmosphere. This seat is formed as a permanent part of the screw and is adjustable by means of the notch 11.

Within the shell 4 there is a syphon tube 14 having its intake close to the bottom of the valve chamber, and its syphon end within the inlet to the valve. When the inverted U shaped return bend portion of the tube is covered with water, the syphon tube starts a syphon operation and the consequent discharge and drainage of condensed water back through the intake extension 3 into the radiator or connecting pipe through which the condensed water drains back to the boiler.

To prevent a situation arising where, when the cylinder is full of condensed water, water will be ejected out through the air relief opening. I have provided an inverted tube open at its bottom and sealed at the top which forms a float 15 which is inactive unless water starts to fill up the valve. It will be observed that the syphon tube 14 has its discharge in the extension 3 and its neck extending up substantially throughout the height of the float. This provides complete drainage at a time when the float begins to rise. When the float is carried upwardly by the elevation of the water level it carries the thermostatic expansible bellows 16 upwardly so that the rod 17 carrying the valve 18 bears against the seat 12 thereby sealing the passage 13.

Ordinarily, however, when the valve is not filled with water, the thermostatically affected expansible bellows will be responsive to the temperature of the steam within the valve and, depending on the adjustment of the screw 10, control the heat given off by the radiator and allow any air within the system to escape into the atmosphere.

To simplify the assembly of the valve and to avoid the necessity of expansive machining operation, I have shown the combination as composed of separate elements. It is within the range of mechanical equivalents to combine some of the separate elements into integral elements as long as the functions of the now separate elements are not impaired.

The operation of the relief valve will be obvious. If the valve fills up with water the float seals the air outlet passage and the syphon tube drains the water from the valve back into the supply pipe from which it flows back to the boiler if the heating system is a single pipe system.

The heat of steam within the valve, when the valve is filled with steam, also expands the bellows and seals the air bleed passage. However, when there is air in the valve the steam does not heat the bellows sufficiently to cause the valve to seat against the valve seat and air escapes to the atmosphere through the passage 13.

The rubber cap 19 is so formed that it compresses against a slit 20 therein thereby keeping it closed and resistant to drawing in air during conditions of vacuum within the valve. However, the slit 20 is not sealed against opening up when air under pressure is forced out through the passage 13. The use of the rubber tip, while effective in controlling the operation of the valve, is not a feature of my invention except in the particular combination shown, as such a top is shown in the Patent No. 1,825,459 to which I have heretofore referred.

The preferred arrangement shown in the drawing is only a preferred embodiment for purposes of illustration. Changes in size and shape of the elements of the combination will readily occur to those skilled in the art. In the claims which follow it should be understood that a steam radiator is a steam heating system but that my valve is useful on other types of steam heating systems.

Having thus described by invention, what I claim as new and desire to secure by Letters Patent is:

1. An air relief valve for a steam heating system comprising a valve chamber having an intake at its base and an air outlet passage, and housed within the valve chamber, a float in the form of an open bottomed hollow member, a syphon tube and a thermostatically expansible bellows, said expansible bellows operatively connected with a valve for closing said air outlet passage, and being in such position within the valve chamber as to be elevatable by contact with said float, said syphon tube having a discharge into the intake and a neck extending up throughout the height of the float when said float is in its lowermost position.

2. In an air relief valve for a steam heating system having a valve chamber with an air exhaust port at its top and an inlet at its base, a float in the form of an open bottomed hollow member, a syphon tube extending up throughout the height of the float when said float is in its lowermost position and having its intake close to the bottom and its discharge in the inlet, and a thermostatically affected expansible bellows located in the valve chamber above the float and having an operative connection with a valve for closing said air exhaust port.

3. In an air relief valve for a steam heating system having a valve chamber with an air exhaust port at its top and an inlet at its base, a float in the form of an open bottomed hollow member, a syphon tube extending up throughout the height of the float when said float is in its lowermost position and having its intake close to the bottom and its discharge in the inlet, and a thermostatically affected expansible bellows located in the valve chamber above the float and having an operative connection with a valve for closing said air exhaust port, and means adjustable exteriorly of said valve chamber for adjusting the seat of said valve.

FRANK C. RISSELT.

REFERENCES CITED

The following references are of record in the file of this patent:

UNITED STATES PATENTS

| Number | Name | Date |
|---|---|---|
| 823,632 | Packard | June 19, 1906 |
| 1,198,918 | Holmberg | Sept. 19, 1916 |
| 1,373,072 | Holmberg | Mar. 29, 1921 |
| 1,587,644 | Harrison | June 8, 1926 |
| 1,629,789 | Harrison | May 24, 1927 |